United States Patent Office 3,278,314
Patented Oct. 11, 1966

3,278,314
SWEETENED PEANUT FOOD
Edward E. Colby, Cincinnati, and John W. Phenix, Wyoming, Ohio, assignors to The Procter & Gamble Company, Cincinnati, Ohio, a corporation of Ohio
No Drawing. Filed Mar. 27, 1964, Ser. No. 355,430
6 Claims. (Cl. 99—128)

This invention relates to a prepared food product and, more particularly, to a stabilized mixture of a peanut spread and a sugar-based food.

The combination of a peanut spread such as peanut butter and a sugar-based food such as jelly or jam has long been a popular sandwich spread, especially with children. Various attempts have been made to market mixtures of these two foods in one container, but without much success. It is well known and frequently observed that peanut butter, upon direct contact with ordinary jelly or jam, will gradually darken during usual marketing storage periods to an unattractive and undesirable dark brown color. This darkening or browning takes place over relatively short periods of time. For example, the ordinary peanut butter-jelly sandwich prepared and wrapped in waxed paper or other protective film usually obtains such an objectionable dark color and a consequential loss in flavor within a few short hours.

In U.S. Patent 3,117,871, granted to Bahr and Krumrei, January 14, 1964, a simulative or artificial food product is disclosed which is a combination of peanut butter and a sweetening composition containing less than 6% moisture. The sweetening composition of that invention contains a fat, such as partially hydrogenated vegetable oil, and sugar, such as sucrose, in a ratio of 3:7 to 7:3. While this type of simulative food product is very useful, an even more desirable sweetened composition with peanut butter would contain a more natural or real food product such as jelly, jam, or marshmallow. Heretofore, it has not been possible to provide such a composition because of the aforementioned undesirable browning which occurs when food products such as ordinary jelly, jam, or marshmallow are placed in admixture with peanut butter.

Accordingly, it is an object of this invention to provide a stable mixture of a peanut spread and a sugar-based food, such as jelly, jam, or marshmallow, which is characterized by strong resistance to browning and darkening of the peanut constituent.

Other objects and advantages will appear from the following detailed description.

It has been found that the objects of this invention are achieved by forming a sweetened peanut composition comprising, by volume of the composition, a non-intimate mixture of from about 25% to about 95% peanut spread and from about 5% to about 75% sugar-based food comprising, by weight of the sugar-based food, from about 15% to about 24% water and from about 76% to about 85% dissolved solids, at least about 50% by weight of said dissolved solids consisting essentially of an edible carbohydrate substance having a molecular weight not in excess of about 200 selected from the group consisting of monosacchrides, polyhydric alcohols, derivatives of monosaccharides and polyhydric alcohols, and mixtures thereof.

The peanut spread used in this invention preferably is a peanut butter containing a major portion of ground peanuts. The peanuts are first roasted and then cooled and separated from the skins to form clean kernels. The peanut spread is generally prepared from these kernels by comminuting the nut meats to form a smooth pasty product in which the nut particles are suspended in an oily medium. Any grinding process is suitable whereby the minute cells in the body of the kernels are ruptured and oil is liberated. The oily medium usually forms about 20% to 30% of the ground peanut mass and provides a natural carrier for the peanut particles. The oil can be partially hydrogenated, if desired. The nuts can be ground to form a smooth-textured peanut butter or a portion of the nut particles can be retained in a larger granular size and added to the smooth peanut butter to form the so-called "crunchy" variety of peanut butter. If it is desired, the comminuted mass can be whipped by various means.

Part or all of the natural peanut oil can be either replaced with or supplemented with other edible glyceridic materials derived from animal, vegetable, and marine fats and oils. These glycerides can have saturated or unsaturated long chain acyl groups having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, behenoyl, and the like, and are generally obtained from edible fats and oils such as cottonseed oil, soybean oil, coconut oil, rapeseed oil, mustard seed oil, nasturtium seed oil, wallflower seed oil, peanut oil, olive oil, palm oil, palm kernel oil, sunflower seed oil, rice bran oil, corn oil, sesame seed oil, safflower oil, whale oil, sardine oil, menhaden oil, herring oil, pilchard oil, salmon oil, lard, tallow and the like. The glycerides can also contain, in part, one or two short chain saturated fatty acid groups having from about 2 to about 6 carbon atoms and derived from acids such as acetic, propionic, butyric, valeric, and caproic. The glycerides can be prepared by random or low temperature directed interesterification reactions or they can be otherwise formed by various known organic syntheses.

The oil base of the peanut butter can also contain minor amounts of conventional emulsifiers and other agents, such, for example, as the higher saturated and unsaturated fatty acid mono- and diglyceride emulsifiers, fatty acid esters of other polyhydric alcohols such as glycol, and lecithin to improve spreadability and prevent dryness and separation of oil.

Minor ingredients such as sodium chloride, sorbic acid, proteins, vitamins, flavoring, color, and antioxidants can be incorporated in the peanut butter.

The sugar-based food used in this invention can consist primarily of a "low" molecular weight carbohydrate substance as well as a combination of "high" and "low" molecular weight carbohydrate substances provided that the total water content of the sugar-based food is from about 15% to about 24% by weight and provided furthermore that at least about 50% by weight of the dissolved solids are "low" molecular weight carbohydrate substances. The sugar-based food is preferably substantially homogeneous and substantially non-crystalline.

The "low" molecular weight carbohydrate substances in the sugar-based food are preferably selected in suitable proportions from monosaccharides (or so-called "simple sugars"), edible polyhydric alcohols, and the edible derivatives of these monosaccharides and polyhydric alcohols having molecular weights not in excess of about 200. Specific examples of the monosaccharides or simple sugars which can be used in the practice of this invention are glyceraldehyde, dihydroxyacetone, glycerose, erythrulose, xylose, arabinose, ribose, lyxose, fucose, rhamnose, desoxyribose, glucose, mannose, galactose, talose, allose, altrose, fructose, sorbose, and, preferably, total invert sugars. Included among the edible polyhydric alcohols which can be used in the practice of this invention are the following which are mentioned as specific examples: glycerol, propylene glycol, erythritol, pentaerythritol, adonitol, xylitol, mannitol, dulcitol, sorbitol, and perseitol.

The edible derivatives of monosaccharides and polyhydric alcohols, as defined herein, are intended to include, for example, oxidation and reduction products of monosaccharides and polyhydric alcohols, and monosaccharides and polyhydric alcohols which contain other groups such as amine, amide, carboxyl, carbonyl, or other radicals which do not interfere with the edibility of the food product or otherwise adversely affect the composition. Specific examples of these materials are saccharic acid, sorbose, and 1-arabonic amide. The edible derivatives of monosaccharides and polyhydric alcohols are preferably used only in part in the sugar-based food in combination with other sugar-based food materials mentioned herein.

The "high" molecular weight carbohydrate substances preferably are selected from sucrose and corn syrup. The corn syrup will, of course, also contain some low molecular weight carbohydrate constituents. As used herein, corn syrup is intended to define the material obtained by the hydrolysis of corn starch by hydrochloric acid or enzyme catalysis, or otherwise, whereby the starch is hydrolyzed into higher saccharides such as maltose as well as lower sugars, such as dextrose, and whereby the total hydrolyzate material has a "dextrose equivalent" (D.E.) ranging from about 20 to about 70 (based on pure dextrose having a D.E. of 100).

The use of the above carbohydrate materials and water in the proportions herein defined forms a superior sugar-based food for direct non-intimate admixture with the peanut spread which can be stored for long periods of time with negligible darkening of the peanut food.

It is to be understood that the sugar-based food preferably has the appearance, taste, and texture of a natural or real food product such as jelly, jam, and marshmallow. Such sugar-based food products have a strong appeal to consumers for use in combination with peanut butter in sandwiches and other culinary spreads. However, it is essential that these sugar-based foods be formed so that they comprise the proportions of ingredients herein defined.

The sugar-base food can contain minor amounts of other ingredients such as sodium chloride, gelatin, coloring, flavoring, pectin, fruit, seed and nut particles, and various other conventional ingredients of jams and jellies.

A preferred embodiment of this invention comprises the non-intimate combination of peanut butter and substantially non-crystalline jam and a container therefor as set forth in Example 5.

The following specific examples will serve to further illustrate this invention. All proportions are by weight unless otherwise stated.

*Example 1*

A smooth-textured peanut butter was prepared from a batch of roasted and finely ground peanuts in admixture with other ingredients according to the following formula:

| Ingredient: | Weight percent |
| --- | --- |
| Peanuts | 90.1 |
| Sodium chloride | 1.4 |
| Dextrose | 3.5 |
| Partially hydrogenated vegetable oil (I.V. 70–75) | 3.1 |
| Substantially completely hydrogenated vegetable oil (I.V. 8) | 1.9 |

This peanut butter was placed in direct contact with various sugar-based foods, each such sugar-based food being in a separate covered petri dish in which the peanut butter occupied half of the dish and the sugar-based food the other half, and with direct contact between the two substances occurring only at the interface along the diameter of the dish.

The several sugar-based food substances were prepared as follows:
(a) A total invert syrup consisting of 68% invert sugar, 3% sucrose and 29% water was concentrated to a water content of 15.22%.
(b) An aqueous sucrose solution containing 67.4% solids was concentrated to a water content of 15.53%.
(c) An aqueous solution of Frodex-24 containing 96.5% corn syrup solids (D.E. 28) was diluted to a water content of about 22.90%.

The percentage figures in (a) through (c) are stated in percent by weight of the total sugar-based food. The covered petri dishes were placed in a constant temperature room at 100° F. for 10 days. The peanut butter browning results obtained are recorded in the following table.

TABLE I

| Sugar-based Food | Peanut Butter Browning [1] | Sugar-based Food Crystallization |
| --- | --- | --- |
| a | 0 | None. |
| b | 316 | Slight. |
| c | 316 | Not tested. |

[1] Width in inches of a dark brown band occurring in the peanut butter at the interface with the sugar-based food.

The above results indicate the substantial superiority of a sugar-based food having a high proportion of invert sugar (a) in comparison with other sugar-based foods consisting solely of aqueous solutions of either sucrose or corn syrup solids having a low D.E. (b and c). It will be understood, of course, that for actual consumer use the sugar-based food, instead of being a simple aqueous mixture of invert sugar as above in (a), preferably will be a more complex composition having the appearance, taste, and texture of a natural or real food product such as jam, jelly, marshmallow, and the like which comprises the proportions of materials herein defined.

*Example 2*

A whipped marshmallow product was prepared as follows: A batch of total invert syrup consisting of about 68% invert sugar, 3% sucrose and 29% water was heated to a temperature of about 235° F. About 3%, by weight of the total invert syrup, of dried egg albumen was added to the syrup and the heat was removed. The mixture was whipped in a Hobart Mixer, speed number 3, with a wire whip for about 13 minutes, during which time the temperature decreased to about 110° F. The whipped marshmallow product had a density of 22 lbs. per cubic foot, a viscosity of 50,000 cps. (Brookfield) and a calculated water content of about 15%, by weight of the total composition.

The marshmallow product was placed in a petri dish in direct contact with a sample of the peanut butter of Example 1 in the manner described therein. After 7 months storage at 100° F., the browning penetration into the peanut butter was only 1/16", whereas several conventional marshmallow formulations having about the same water content but containing less than 50% invert sugar in combination with greater than 50% sucrose, showed browning penetrations ranging from 1/4" to 1/2" in width during approximately the same storage periods.

*Example 3*

100 parts of frozen strawberries were completely thawed to a temperature of about 40° F. The thawed strawberries consisted of about 20% sugar (about one-half sucrose and one-half invert sugar), about 74% water, and about 6% other matter. The berries were separated from the juice with a colander and set aside for the subsequent use described below. A sweetened syrup was then formed by mixing about 64 parts of liquid invert syrup (68% invert sugar, 3% sucrose, and 29% water) into the strained berry juice with heating and agitation until complete dissolution had taken place. 0.2 parts of Pectinol enzyme were added to the syrup and the mixture was heated for about 20 minutes at 130°–150° F. The syrup was then further sweetened by dissolving therein about 32.5 parts solid sucrose. Inactivation of the Pectinol enzyme was accomplished by passing the sweetened syrup through a heater at 210° F. for several seconds. The syrup was then evaporated with steam in a rising film evaporator under a 26 inch vacuum and with an evaporator outlet-temperature of about 180° F. to produce a concentrated syrup having a water content of about 17%. After the concentrated syrup was cooled to a temperature of about 120° F., the previously drained berries were mixed therein to form the crude jam. A separate solution was then prepared by dissolving about 0.06 part dry pectin and 0.20 part dry citric acid in 1.20 parts water. This separate solution was then thoroughly mixed into the crude jam. The crude jam was evaporated with steam in a rotating film evaporator under a 28 inch vacuum and with an evaporator outlet-temperature of 160° F. to produce a final jam having a moisture content of about 20%. The jam was then cooled to a temperature of less than about 85° F. and filled into containers.

Portions of the final jam product were placed in petri dishes in direct contact with samples of the peanut butter of Example 1 in the manner described therein.

(a) After two months storage at 70° F., no browning of the peanut butter and no crystallization of the jam was observed.
(b) After two months storage at 100° F., only a slight trace of browning of the peanut butter was observed. The jam had not crystallized.
(c) After four months storage at 70° F., no browning of the peanut butter was observed and only a slight amount of soft crystals in the jam was noticeable.
(d) After four months storage at 100° F., only a slight trace of browning was seen and no crystals were observed.

The above storage-stable peanut butter-jam samples (a through d) make excellent sandwich spreads when the peanut butter and jam components of the samples are non-intimately admixed together.

*Example 4*

Several batches of strawberry jam were prepared according to the procedure described in Example 3, except that the evaporation was controlled to form final jam products having moisture contents of 20%, 24%, 30%, and 33%, respectively. Separate portions of each batch were stored in petri dishes in the manner of Example 1 in direct contact with the peanut butter described therein for a period of six months at 70° F., 80° F., and 90° F., respectively.

The following table indicates the browning results observed at the end of the six month storage period.

TABLE II

| Weight percent Moisture | Storage Temperature | | |
|---|---|---|---|
| | 70° F. | 80° F. | 90° F. |
| 20 | No evidence of browning. | No evidence of browning. | No evidence of browning. |
| 24 | Negligible browning. | Negligible browning. | Negligible browning. |
| 30 | ⅛″ brown band | ⅛″ brown band | Greater than ⅛″ dark band. |
| 33 | ____do____ | ____do____ | Do. |

The above results indicate the undesirable browning which occurs in peanut butter when it is placed in direct contact with jam having a moisture content greater than about 24% even though the jam comprises greater than about 50% invert sugar. When the moisture content in the jam is reduced to less than about 15%, undesirable crystallization occurs.

*Example 5*

The peanut butter of Example 1 and the jam of Example 3 were packaged in non-intimate combination in a sealed flint glass jar. The peanut butter and jam had substantially non-flowable consistency at room temperature (70° F. to 90° F.). They were each placed in the jar in approximately equal quantities by volume with a filling machine which layered the peanut butter and jam into a two component product having a vertically-disposed spiral design leaving an extensive and complicated contact area between the separate masses of the two components. The packaged peanut butter-jam combination had an attractive appearance and remained storage-stable without browning for a period of six months at temperatures ranging from 70° F. to 90° F. The packaged combination provided a convenient sandwich spread having excellent flavor and eating qualities. In such packaged combinations, it is preferable that the peanut butter and jam be filled into the container in a ratio within the range of from about 25:75 to about 95:5 parts by volume, respectively.

The peanut spreads and sugar-based foods of this invention illustrated by the above examples can be used to make excellent sandwich spreads.

The above examples are merely illustrative of the invention, and the skilled artisan will be able to construct many more examples which come within the scope of this invention after reading the above specification and the appended claims.

What is claimed is:

1. A sweetened peanut composition characterized by strong resistance to browning comprising, by volume of the composition, a non-intimated mixture of from about 25% to about 95% peanut spread and from about 5% to about 75% of a substantially non-crystalline sugar-based food selected from the group consisting of marshmallow, jam and jelly, comprising, by weight of the sugar-based food, from about 15% to about 24% water and from about 76% to about 85% dissolved solids, at least about 50% by weight of said dissolved solids consisting essentially of an edible carbohydrate substance having a molecular weight not in excess of about 200 selected from the group consisting of monosaccharides, polyhydric alcohols, derivatives of monosaccharides and polyhydric alcohols, and mixtures thereof.

2. The composition of claim 1 in which the peanut spread is a smooth-textured peanut butter consisting essentially of ground peanuts.

3. The composition of claim 1 in which the edible carbohydrate substance having a molecular weight not in excess of about 200 consists essentially of invert sugar.

4. A packaged sweetened peanut product resistant to browning comprising a non-intimate combination of peanut butter and substantially non-crystalline jam and a container therefor, said peanut butter and said jam being disposed in separate masses, unmixed each with the other, within the container, the ratio of peanut butter to jam being within the range of from about 25:75 to about 95:5 parts by volume, said jam comprising, by weight of the jam, from about 15% to about 24% water and from about 76% to about 85% dissolved solids, at least about 50% by weight of said solids being invert sugar.

5. The product of claim 4 wherein said peanut butter and said jam are in a vertically-disposed spiral design.

6. The process of making a packaged edible composition resistant to browning which comprises introducing into a container in separate masses, unmixed with each other, peanut spread and a substantially non-crystalline sugar-based food selected from the group consisting of marshmallow, jam, and jelly, the ratio of said peanut spread to said sugar-based food, by volume of the composition, being within the range of from about 25:75 to about 95:5, said sugar-based food comprising, by weight of the sugar-based food, from about 15% to about 24% water and from about 76% to about 85% dissolved solids, at least about 50% by weight of said solids consisting essentially of an edible carbohydrate substance having a molecular weight not in excess of about 200 selected from the group consisting of monosaccharides, polyhydric alcohols, derivatives of monosaccharides and polyhydric alcohols, and mixtures thereof.

References Cited by the Examiner

UNITED STATES PATENTS

| | | | |
|---|---|---|---|
| 1,158,297 | 10/1915 | Root | 99—126 |
| 1,696,766 | 12/1928 | Howe | 99—128 |
| 3,044,883 | 7/1962 | Ferguson | 99—128 |
| 3,117,871 | 1/1964 | Bahr et al. | 99—128 |

A. LOUIS MONACELL, *Primary Examiner.*

S. E. HEYMAN, *Assistant Examiner.*